Nov. 29, 1949     E. F. HASKELL     2,489,639
CAKE OF SOAP
Filed Oct. 26, 1945     2 Sheets-Sheet 1
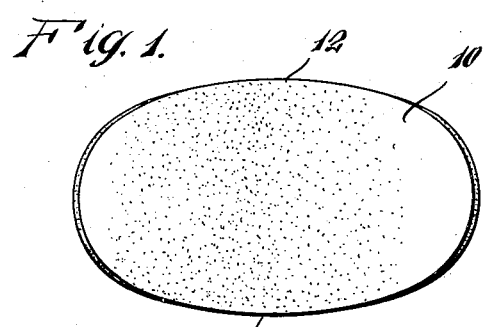
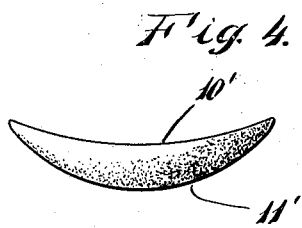
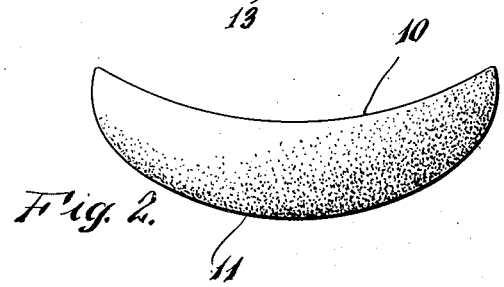
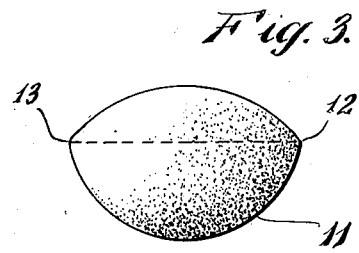
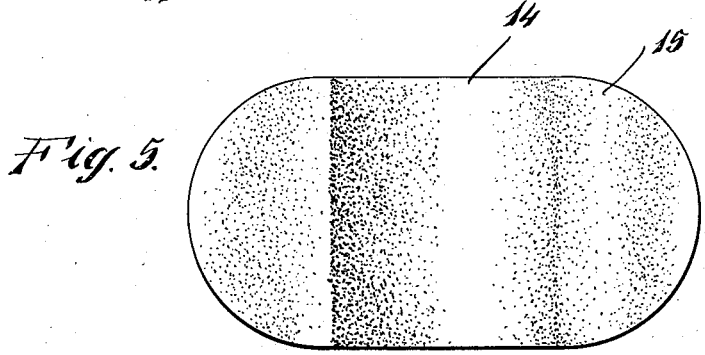
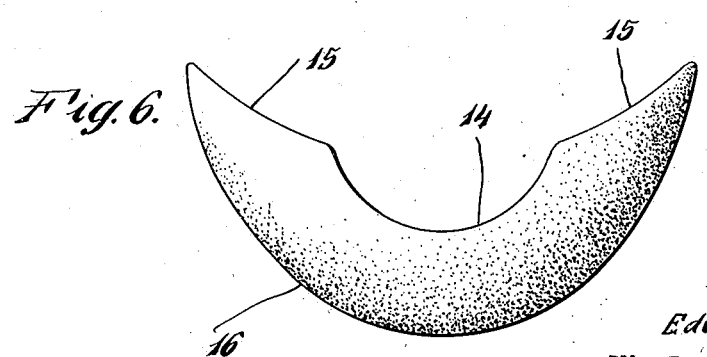
INVENTOR.
Edward F. Haskell
BY Roger Williams
ATTORNEY

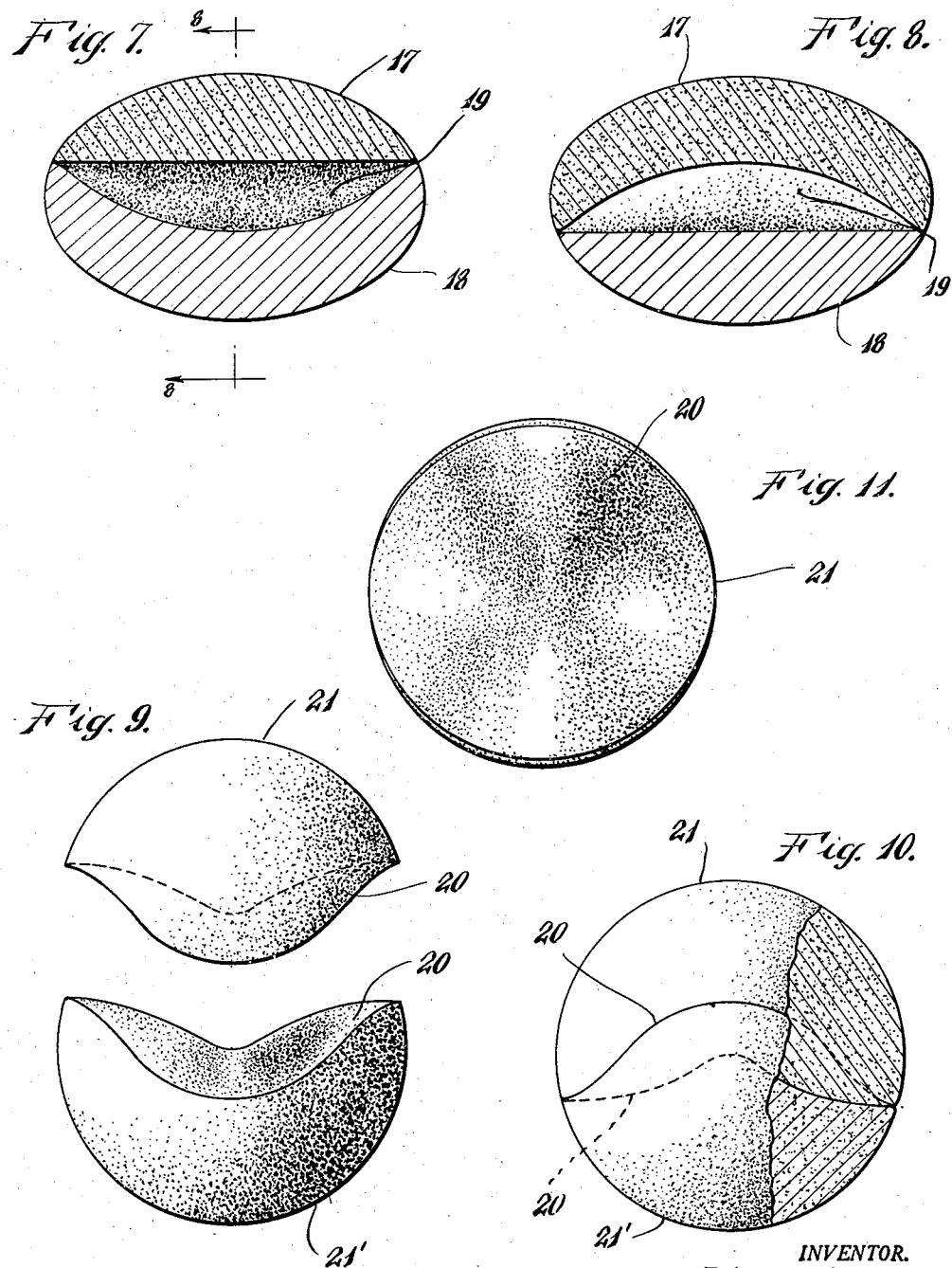

Patented Nov. 29, 1949

2,489,639

UNITED STATES PATENT OFFICE 2,489,639

CAKE OF SOAP

Edward F. Haskell, New York, N. Y.

Application October 26, 1945, Serial No. 624,888

2 Claims. (Cl. 252—134)

The present invention relates to a cake of soap. More especially it relates to a cake of soap designed for toilet use.

A cake of soap intended for personal use will present many advantages if it is so designed that it affords at least one surface which has a three dimensional configuration corresponding to the configuration of the surfaces upon which the cake of soap is to be employed.

Since substantially all the external contours of the human body are convex in nature, a cake of soap presenting a concave surface will be best adapted to fit and make contact with such body surfaces.

In the prior art, it has been customary to shape a cake of soap so that the surface available for use in contact with the body has been either substantially flat, or else has been convex. In either of these cases the area of contact between the soap and the body has been very small. Due to the limited degree of flattening of the skin when subjected to pressure, a flat-surfaced bar of soap has been able to make contact with a rather limited area of the body at a given instance. Such area of contact has only been available at the expense of distortion of the skin and tissues underlying the skin, and with the necessity of the user of the soap exerting a considerable degree of pressure thereupon. In the case of the so-called oval bar of soap, the area of contact with the body has been still less, so that the disadvantages and difficulties just mentioned have been enhanced in degree.

I have discovered that, if a bar of soap be constructed so that the surface to be applied to the body is of a generally concave shape, the area of contact between the cake of soap and the body, under a given degree of pressure exerted upon the cake, will be greatly increased, thereby facilitating efficiency with regard to the expenditure of muscular energy and reducing the concurrent disagreeable sensations arising from the compression of the skin immediately beneath the bar of soap.

One object of this invention is to provide a cake of soap in which the area of contact between the cake and the body is greatly increased.

Another object of this invention is to provide a cake of soap in which a given area of body may be effectively covered by the cake with a minimal amount of pressure, and consequently with the need for a minimal number of movements of the cake.

Yet another object of this invention is to provide a cake of soap operative under a relatively gentle degree of pressure, so that the touch sensations resulting from the contact of the cake with the human body are relatively more pleasant than the sensations produced by the application of a flat or convex surface to the body, this phenomenon being analogous to the sensations produced respectively by the applications of a clenched fist and an open hand to the body.

Still another object of this invention is to provide a cake of soap in which the surface upon which the soap rests when not in use, remains convex or concave, so that only a relatively small portion of this surface will contact a plane surface supporting the soap, resulting in better air circulation, better drainage, a more rapid drying of the cake and in less wastage of material, thereby promoting both convenience and economy.

Another purpose of this invention is to provide a cake of soap which maintains, to a substantial degree, its original form, during the life of the cake of soap, so that the advantages of rapid drying and convenience of shape are maintained.

Yet another purpose of this invention is to provide a cake of soap which, after being worn down to a size no longer conveniently usable, may readily be caused to adhere to a new cake of any shape, thus assuring the preservation and use of such soap remnants.

Still another object of this invention is to provide a cake of soap of such shape that individual cakes may readily be stacked upon one another for purposes of storing or shipping with minimum danger of breakage and with maximum use of a given storage or packing space.

Reference is now made to the hereunto attached drawings in which

Fig. 1 is a plan view of one form of this invention;

Fig. 2 is a side elevation of the device shown in Fig. 1;

Fig. 3 is an end elevation of the device of Fig. 1;

Fig. 4 is a side elevation of a cake of soap of the form shown in Figs. 1, 2, and 3, after considerable use;

Fig. 5 is a plan view of a modified form of this invention;

Fig. 6 is side elevation of the form of device shown in Fig. 5;

Fig. 7 is a side elevation of two partly interlocking cakes of soap, illustrating another modification of this invention;

Fig. 8 is a vertical section taken on the lines 8—8 of Fig. 7;

Fig. 9 shows two bars of soap about to interlock with one another, illustrating still another modified form of this invention;

Fig. 10 shows, partly in section, the two bars of Fig. 9 completely interlocked; and Fig. 11 is a plan view of a single cake of soap of the form shown in Fig. 9.

Referring especially to Figs. 1, 2, and 3, the surface 10 of the cake of soap designed for use in contact with the body is of a generally concave shape, so that it will fit the contours of the body. The opposite surface 11 is preferably spheroidal in shape so that it readily fits the palm of the hand, and may easily be held with minimal danger of slippage from the hand. The general form of the concave curvature is cylindrical, so that a line joining points 12 and 13 will be substantially a straight line. This allows the bar of soap to be moved laterally along a portion of the body, for instance the arm. It has previously been proposed to form a cake of soap having a prolate ellipsoidal concavity therein. This can be seen to be quite distinct from the generally cylindrical concavity herein disclosed, since the cavity having curvature in two dimensions would be of extremely limited application to the body, the efficient use thereof being substantially limited to such portions as the elbow and the nose.

Since this cake of soap is worn down concavely, by rubbing along the body surfaces, upon the one face of the soap, and spheroidally by contact with the hand on the other face, it will not alter its properties, contrary to the usual cake, which wears to a generally flat surface, thereby readily absorbing water from the soap-dish, causing softening and wastage of the cake.

As the cake of soap just described wears down in use, it will assume the general form shown in Fig. 4, where the surfaces 10' and 11' are still concave and convex, respectively, thus allowing a used cake to be placed in contact with the similar surfaces of a unused cake, so that wastage of soap is diminished, or substantially eliminated.

In Figs. 5 and 6 is shown a modified form of this invention in which the active surface is provided with an inner portion 14 having a curature of relatively small radius, while the outer portion 15 of this surface takes the form of substantially cylindrically curved surfaces of relatively great radius. The back portion 16 of the cake is conveniently made spheroidal, so that it fits the hand and so that the cakes of soap may be stacked on top of one another, either for the purpose of utilizing the entire cake of soap, or for storage purposes.

In this form of my invention, the portion 14 will readily make contact with such portions of the body as have a high degree of curvature, while portions 15 will make contact with such portions of the body as have a relatively small degree of curvature. It is to be noted that the natural wear upon the cake of soap will cause the degree of concavity to adjust itself to the average degree of convexity of the body of a particular user. Furthermore, cakes of soap according to this invention may be supplied with varying degrees of curvature to suit the individual employing the soap.

In Figs. 7 and 8 is shown a double cake of soap, each portion thereof being substantially circular, with each supplied with a substantially cylindrically concave active surface. When these portions 17 and 18 are turned so that the axes of the two cylindrical surfaces are at right angles, they will partially interlock, so that they will occupy less space and may conveniently be packed in this assembled form, either before or after use, thereby promoting compactness and efficiency of space.

It will be seen that two portions of such shape will not completely interlock, but will leave a small space 19 therebetween, when they are interlocked as shown in the drawings.

In order to secure more complete interlocking or interfitting of two portions of soap according to this invention, the contacting surfaces thereof may be made of the form illustrated in Figs. 9, 10, and 11, where the active surface 20 of each cake portion is formed in a geometric curve known as a saddle. In Fig. 9, it can be seen that the saddle surfaces of two such cakes will approach one another equidistantly at all points, so that, when completely interlocked they will assume the form of a substantially complete sphere, shown in Fig. 10, provided with the holding surfaces 21 and 21' of spherical contour.

This form of my invention will wear down, when used, so that the inner face of each portion will assume a smooth concave contour of the generally cylindrical shape of the previously described forms of this invention.

One advantage of this invention is that no ridges or other obstructions, on the surface of the cake of soap impede its contact with the convex surface of the body.

Another advantage of this invention is that the cake of soap makes the maximum possible contact with the body surfaces, especially those encountered in bathing and shampooing, while the cake is at the same time firmly and easily grasped by the hand.

A still further advantage of this invention is that the cake of soap contacts the ordinarily flat surfaces upon which it is placed to dry, along a minimum area of surface, so that wearing away, by absorption of moisture from the holder is minimized, and rapid drying by air circulation and speedy drainage are promoted.

Yet another advantage of this cake of soap is that it may be used down to a wafer thickness, as pressure exerted thereupon by the hand is easily counter-balanced on the wearing surface of the soap, due to the fact that it makes contact with the body surface substantially over the entire area of the cake.

Certain forms of this invention present the advantage of affording different degrees of concavity, for differing portions of the body.

Finally, certain other forms of this invention, as above described, are especially suited for stacking or storage in pairs, thus promoting efficiency of space occupied, and being attractive from various psychological viewpoints.

While there have been shown certain embodiments of this invention, other embodiments and modifications thereof will be apparent to those skilled in the art and the scope of this invention is limited only by the hereunto appended claims.

What I claim is:

1. A cake of soap having concave curvature on the surface presented to the user and having spheroidal curvature on the other surface thereof, said concave curvature being generally cylindrical, both said surfaces making contact with one another along a single continuous curved edge, whereby wear of said soap maintains said edge substantially unaltered in form.

2. A cake of soap suitable for engaging the external bodily contours of the person, characterized in that one surface of said cake is formed with a concave curvature extending substantially to the extreme edges of the cake, said curvature being generally cylindrical about an axis normal to the longitudinal dimension of said cake, and also characterized in that another surface of said cake is generally spheroidal in contour, so as to fit the hand and said two surfaces meet along a single continuous curved edge.

EDWARD F. HASKELL.

REFERENCES CITED

The following references are of record in the file of this patent:

UNITED STATES PATENTS

| Number | Name | Date |
| --- | --- | --- |
| D. 124,755 | Voorhis | Jan. 21, 1941 |
| D. 134,045 | Voorhis | Oct. 13, 1942 |
| 268,321 | Van Haagen | Nov. 28, 1882 |
| 906,371 | Benitz | Dec. 8, 1908 |
| 1,495,978 | Anderson | June 3, 1924 |

FOREIGN PATENTS

| Number | Country | Date |
| --- | --- | --- |
| 371,371 | Germany | Mar. 15, 1923 |